United States Patent
Bahng et al.

(10) Patent No.: US 8,081,577 B2
(45) Date of Patent: Dec. 20, 2011

(54) METHOD OF CALCULATING SOFT VALUE AND METHOD OF DETECTING TRANSMISSION SIGNAL

(75) Inventors: Seung Jae Bahng, Daejeon (KR); Jung Pil Choi, Daejeon (KR); Youn-Ok Park, Daejeon (KR)

(73) Assignees: Samsung Electronics Co., Ltd., Suwon-si (KR); Electronics and Telecommunications Research Institute, Daejeon (KR)

( * ) Notice: Subject to any disclaimer, the term of this patent is extended or adjusted under 35 U.S.C. 154(b) by 747 days.

(21) Appl. No.: 12/141,673

(22) Filed: Jun. 18, 2008

(65) Prior Publication Data

US 2009/0147887 A1 Jun. 11, 2009

(30) Foreign Application Priority Data

Dec. 6, 2007 (KR) .................. 10-2007-0126234

(51) Int. Cl.
*H04L 12/56* (2006.01)
*H04J 1/16* (2006.01)
(52) U.S. Cl. .............. 370/252; 370/203; 375/341
(58) Field of Classification Search .......... 375/340, 375/341; 370/252, 203
See application file for complete search history.

(56) References Cited

U.S. PATENT DOCUMENTS

| 2006/0115026 A1* | 6/2006 | MacLeod ............ 375/343 |
| 2007/0016414 A1* | 1/2007 | Mehrotra et al. ....... 704/230 |
| 2007/0086541 A1 | 4/2007 | Moon et al. |

FOREIGN PATENT DOCUMENTS

| KR | 10-2007-0052037 A | 5/2007 |
| KR | 10-2008-0050239 A | 6/2008 |

OTHER PUBLICATIONS

Kawai et al., Likelihood Function for QRM-MLD Suitable for Soft-Decision Turbo Decoding and Its Performance for OFCDM MIMO Multiplexing in Multipath Fading Channel, Special Section on Multi-carrier Signal Processing Techniques for Next Generation Mobile Communications, Jan. 2005, pp. 47-57, IEICE Trans. Commun., vol. E88, No. 1.

* cited by examiner

*Primary Examiner* — John Pezzlo
(74) *Attorney, Agent, or Firm* — Jefferson IP Law, LLP (57) ABSTRACT

The present invention relates to a method of calculating a soft value and a method of detecting a transmission signal. The present invention estimates a channel on the basis of a received signal and rearranges a plurality of data streams. Further, a plurality of substitute vectors are selected from the rearranged data streams and a metric corresponding to each of the substitute vector is calculated. Further, a threshold value is calculated from a metric calculated for each of the substitute vectors and a soft value of each bit of a transmission signal is calculated from the metric and threshold value corresponding to each of the substitute vectors.

9 Claims, 6 Drawing Sheets

METHOD OF CALCULATING SOFT VALUE AND METHOD OF DETECTING TRANSMISSION SIGNAL

CROSS-REFERENCE TO RELATED APPLICATION

This application claims priority to and the benefit of Korean Patent Application No. 10-2007-0126234 filed in the Korean Intellectual Property Office on Dec. 6, 2007, the entire contents of which are incorporated herein by reference.

BACKGROUND OF THE INVENTION (a) Field of the Invention

The present invention relates to a method of calculating a soft value and a method of detecting a transmission signal. More particularly, the present invention relates to a method of calculating a soft value and a method of detecting a transmission signal in a multiple input multiple output (MIMO) system using spatial multiplexing (SM).

(b) Description of the Related Art

The next generation mobile communication system has been required to provide high-rate data transmission for stationary and mobile environments. In order to satisfy these requirements, a multiple input multiple output (MIMO) system using spatial multiplexing (SM) that enables high-rate data transmission by enabling multiple data stream transmission has attracted attention.

In the MIMO system using spatial multiplexing, a transmitting terminal transmits data streams indicating different information through each transmitting antenna and a receiving terminal separates the data streams transmitted from the transmitting terminal.

In the data layer separation method according to the related art, maximum likelihood (ML) bit metric detection has been used in which a maximum likelihood metric is calculated for each of signal vectors that can be transmitted and a transmission signal vector having the smallest ML metric is searched, in order to perform optimal transmission signal detection.

However, while the ML bit metric detection provides optimal transmission signal detection performance, it has a drawback in that extremely high complexity is required, because hardware complexity is exponentially increased with respect to the size of a constellation and the number of transmitting antennas.

In order to complement the drawback in the ML bit metric detection, as linear signal detection having reduced complexity, a zero forcing (ZF) method and a minimum mean square estimator (MMSE) method have been suggested in the related art. However, these methods have a problem in that performance is degraded as compared with the ML bit metric detection. Further, in order to complement the drawback in the ML bit metric detection, as non-linear signal detection having reduced complexity, ordered successive interference cancellation (OSIC) that is known as vertical Bell Lab layered space time (VBLAST) has been suggested. However, while the VBLAST can be easily implemented and provides excellent performance than the ZF and MMSE methods, it has a problem in that performance is degraded as compared with the ML bit metric detection.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a method of detecting a transmission signal and a method of calculating a soft value in a multiple input multiple output (MIMO) system using spatial multiplexing, having advantages of reducing complexity while improving transmission symbol detection performance.

In order to achieve the objects of the present invention, a method of calculating a soft value of a receiver includes: detecting a plurality of substitute vectors using a plurality of data streams; calculating a plurality of metrics corresponding to each of the substitute vectors on the basis of square roots of Euclidean distances of the substitute vectors; calculating a threshold value using the metrics; and calculating a soft value for each bit of a transmission signal using the substitute vectors and the threshold value.

Further, according to another aspect of the present invention, a method of detecting a transmission signal of a receiver includes: rearranging a plurality of data streams; selecting a plurality of substitute vectors using the rearranged data streams; calculating a plurality of metrics corresponding to each of the substitute vectors on the basis of square roots of Euclidean distances of the substitute vectors; calculating a soft value of each bit of a transmission signal using the metrics and threshold values calculated from the metrics; and detecting the transmission signal on the basis of the soft value.

According to the present invention, the receiver can detect a transmission signal using a method of calculating a soft value having improved performance and low complexity in a multiple input multiple output (MIMO) system using spatial multiplexing.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

It will be further understood that the terms "comprises" and/or "comprising," when used in this specification, specify the presence of stated components, but do not preclude the presence or addition of one or more other components, unless specifically stated. In addition, the terms "-er", "-or", "module", and "block" described in the specification mean units for processing at least one function and operation, and can be implemented by hardware components or software components, and combinations thereof.

Hereinafter, a receiver, a method of calculating a soft value, and a method of detecting a transmission signal in a multiple input multiple output (MIMO) system using spatial multiplexing (SM) according to an exemplary embodiment of the present invention will be described in detail with reference to the accompanying drawings.

Figure 1:
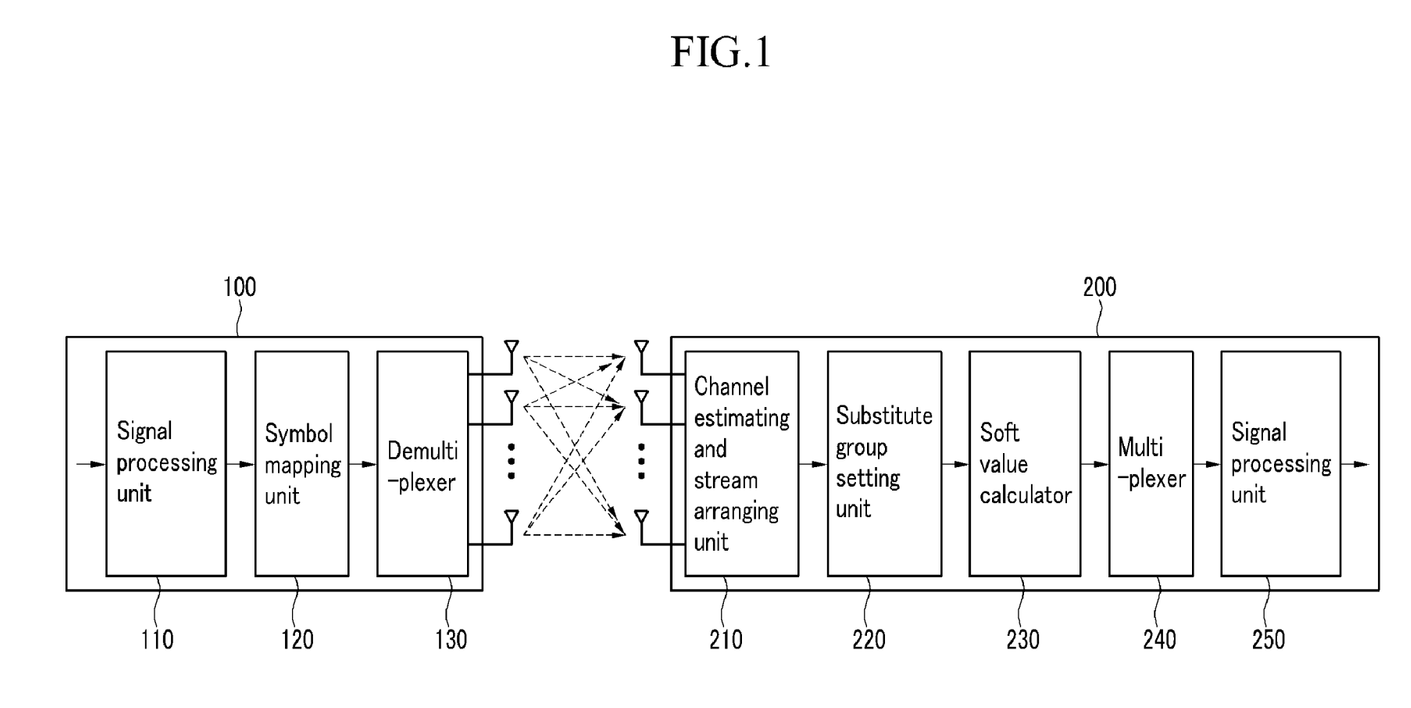
FIG. 1 is a configuration diagram illustrating a transmitter and a receiver according to an exemplary embodiment of the present invention.

FIG. 1 is a diagram illustrating the structures of a transmitter 100 and a receiver 200 according to an exemplary embodiment of the present invention, which shows the transmitter 100 and the receiver 200 of a MIMO system.

The transmitter 100 and the receiver 200 according to the exemplary embodiment of the present invention may have a different number of transmitting/receiving antennas. However, for better comprehension and ease of description, the structures of a transmitter and a receiver will be described using a 4×4 MIMO system in which the transmitter 100 has four transmitting antennas and the receiver 200 has four receiving antennas.

Referring to FIG. 1, the transmitter 100 includes a signal processing unit 110, a symbol mapping unit 120, and a demultiplexer 130.

The signal processing unit 110 performs signal processing, such as scrambling, error correction coding, and interleaving, on transmitted data, and transmits the transmitted data to the symbol mapping unit 120. In this case, the transmitted data that is input to the signal processing unit 110 means binary data that is transferred from a medium access control (MAC) layer to a physical layer.

The symbol mapping unit 120 converts the transmitted data that is processed and output by the signal processing unit 110 into high-speed symbols on the basis of a modulation method.

The demultiplexer 130 divides the high-speed symbols that are converted by the symbol mapping unit 120 into four low-speed data streams on the basis of the number of transmitting antennas and outputs the four low-speed streams. The output four low-speed streams are simultaneously transmitted through the transmitting antennas, respectively.

The receiver 200 includes a channel estimating and stream arranging unit 210, a substitute group setting unit 220, a soft value calculator 230, a multiplexer 240, and a signal processing unit 250.

The channel estimating and stream arranging unit 210 performs channel estimation using signals that are received through the receiving antennas, and rearranges data streams and channels and then outputs the rearranged data streams and channels. According to a method of rearranging data streams, the data streams are sequentially arranged from a data stream having the largest signal-to-noise ratio (SNR).

The substitute group setting unit 220 determines a substitute group of transmission signals using the rearranged data stream and channels received from the channel estimating and stream arranging unit 210.

The soft value calculator 230 calculates a soft value of each bit of a plurality of data streams using the substitute group of transmission signals determined by the substitute group setting unit 220.

The multiplexer 240 and signal processing unit 250 perform opposite functions to the demultiplexer 130 and signal processing unit 110 of the transmitter 100 and channel decoding using the soft values calculated by the soft value calculator 230, and detect a transmission signal.

Next, referring to FIG. 2 to FIG. 5, a method of detecting a transmission signal in the receiver 200 according to an exemplary embodiment of the present invention is described in detail.

Figure 2:
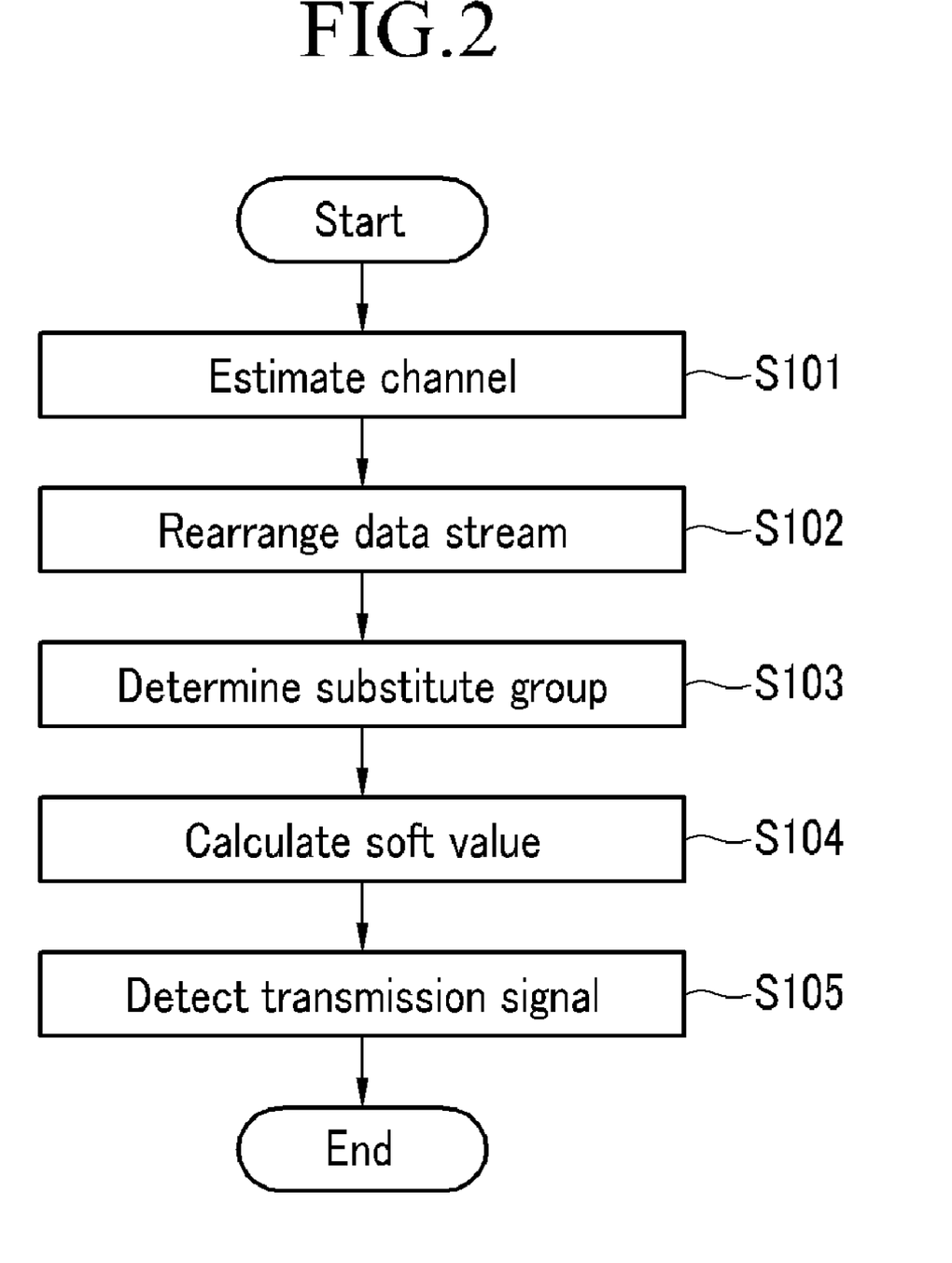
FIG. 2 is a flowchart illustrating a method of detecting a transmission signal in a receiver according to an exemplary embodiment of the present invention.
Figure 3:
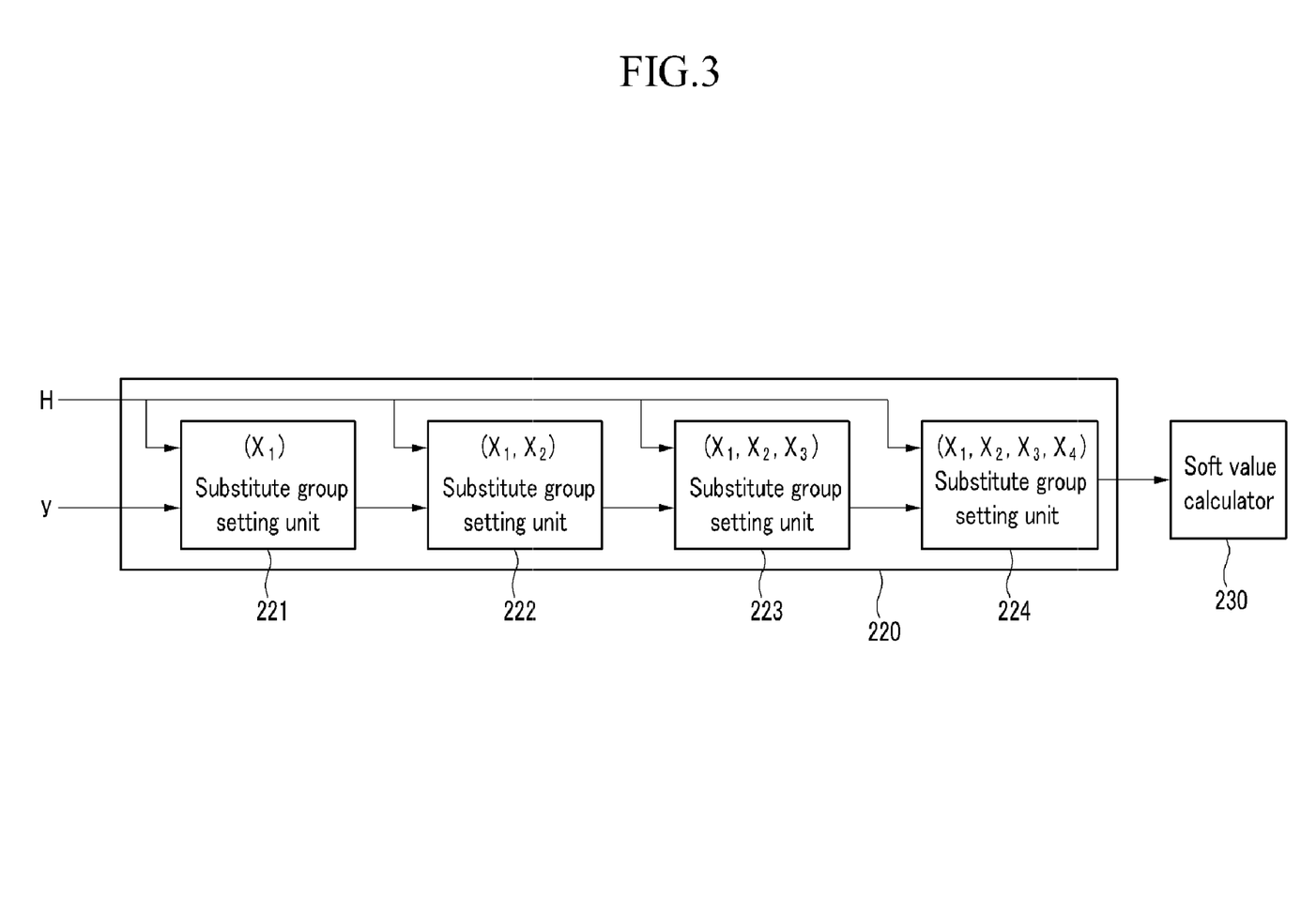
FIG. 3 is a configuration diagram illustrating a substitute group setting unit according to an exemplary embodiment of the present invention.

FIG. 2 is a flowchart illustrating a method of detecting a transmission signal in the receiver 200 according to an exemplary embodiment of the present invention, and FIG. 3 is a configuration diagram illustrating the substitute group setting unit 220 according to an exemplary embodiment of the present invention in detail.

Referring to FIG. 2, when a signal is received through the antenna of the receiver 200, the channel estimating and stream arranging unit 210 performs channel estimating using the received signal (S101) and rearranges transmission signals, i.e., data streams (S102). The channel estimating and stream arranging unit 210 sequentially rearranges the data streams in the order of high SNR.

A system model after the rearrangement is expressed as the following Equation 1.

$$y = Hx + n \quad \text{(Equation 1)}$$

where $y=[y_1\ y_2\ y_3\ y_4]^T$, $x=[x_1\ x_2\ x_3\ x_4]^T$, $n=[n_1\ n_2\ n_3\ n_4]^T$ and $H=[h_1\ h_2\ h_3\ h_4]^T$ respectively indicate rearranged received signals, transmission signals, noise, and a 4×4 channel matrix. Accordingly, $x_1$ is a symbol of a data stream having the highest SNR, and $x_4$ is a symbol of a data stream having the lowest SNR.

As described above, the channel matrix (H) and data stream (x) rearranged by the channel estimating and stream arranging unit 210 are input to the substitute group setting unit 220, and the substitute group setting unit 220 determines a substitute group of transmission signals using them (S103).

FIG. 3 illustrates the operation of the substitute group setting unit 220 in detail for each step.

Referring to FIG. 3, substitute group setting unit 220, for the 4×4 MIMO system, determines a substitute group of corresponding data streams through four steps of an $(x_1)$ substitute group setting unit 221, an $(x_1, x_2)$ substitute group setting unit 222, an $(x_1, x_2, x_3)$ substitute group setting unit 223, and an $(x_1, x_2, x_3, x_4)$ substitute group setting unit 224, and then transmits the determined substitute groups to the soft value calculator 230. The operation and explanation of each step is as follows.

First, describing the operation of the $x_1$ substitute group setting unit 221, since $x_1$ is a symbol of a data stream having the highest SNR, Equation 1 can be expressed as Equation 2.

$$y - h_1 x_1 = h_2 x_2 + h_3 x_3 + h_4 x_4 + n \quad \text{(Equation 2)}$$

Here, when $P_1$ is defined as a projection matrix to a noise subspace perpendicular to a signal subspace that can be made by the channels $h_2$, $h_3$, and $h_4$ except for the channel corresponding to $x_1$, $P_1$ satisfies Equation 3 for $H_{2:4} \equiv [h_2, h_3, h_4]$.

$$P_1 = I_4 - H_{2:4}(H_{2:4}^H H_{2:4})^{-1} H_{2:4}^H \quad \text{(Equation 3)}$$

Here, it can be seen that characteristics of the projection matrix $P_1$ are $P_1 h_2 = P_1 h_3 = P_1 h_4 = 0$. When the $x_1$ is known, the following Equation 4 can be obtained.

$$P_1(y - h_1 x_1) = P_1(h_2 x_2 + h_3 x_3 + h_4 x_4 + n) = P_1 n \quad \text{(Equation 4)}$$

On the other hand, when the $x_1$ is not known, that is, when $\tilde{x}_1(\neq x_1)$ is not the exact transmission symbol, the following Equation 5 can be obtained.

$$P_1(y-h_1\tilde{x}1)=P_1(h_1x_1+h_2x_2+h_3x_3+h_4x_4+n-h_1\tilde{x}_1)=P_1\\(h_1x_1-h_1\tilde{x}_1+n)=P_1(h_1x_1-h_1\tilde{x}_1)+P_1(n) \quad \text{(Equation 5)}$$

Comparing the norms of result vectors in Equation 4 and Equation 5, it can be seen that there is a high probability that the norm is small when the exact $x_1$ is known. Using the characteristics, for setting an $(x_1)$ substitute group, $r_{1,k}$ can be defined as the following Equation 6.

$$r_{1,k} \equiv y - h_1\hat{x}_{1,k} \text{ where } \hat{x}_{1,k} \in \Omega, k=1,\ldots,C \quad \text{(Equation 6)}$$

Here, $\Omega$ is a set of constellation dots, and the number of the constellation dots is defined as $C=|\Omega|$.

Further, the $(x_1)$ substitute group setting unit 221 selects $\beta$ sets of symbols having less $P_1 r_{1,k}$, i.e., the first substitute group $(B_1 \equiv \{x_{1,1},x_{1,2},\ldots,x_{1,\beta}\})$, considering all constellation dots for all symbols of $\hat{x}_{1,k}$.

Next, the operation of the $(x_1, x_2)$ substitute group setting unit 222 is described.

When $P_2$ is defined as a projection matrix to a subspace perpendicular to a signal subspace that can be made by channels $h_3$ and $h_4$ except for the channels corresponding to $(x_1, x_2)$, $P_2$ can be obtained as the following Equation 7 for $H_{3:4} \equiv [h_3,h_4]$.

$$P_2 = I_4 - H_{3:4}(H_{3:4}^H H_{3:4})^{-1} H_{3:4}^H \quad \text{(Equation 7)}$$

The $(x_1, x_2)$ substitute group setting unit 222 defines $r_{2,k} \equiv y - h_1\hat{x}_1 - h_2\hat{x}_{2,k}$ (where $\hat{x}_1 \in B_1$, $\hat{x}_{2,k} \in \Omega$), and selects $\beta$ sets of symbols having less $P_2 r_{2,k}$, i.e., the second substitute group $(B_2 \equiv \{(x_1,x_2)_1,(x_1,x_2)_2,\ldots,(x_1,x_2)_\beta\})$, for $\beta$ $\hat{x}_1$s, considering all constellation dots for all symbols of $\hat{x}_{2,k}$. Accordingly, $\beta$ substitute groups of $(x_1, x_2)$ are selected from the total $(\beta \times C)$ numbers of $(x_1, x_2)$.

Next, the operation of the $(x_1, x_2, x_3)$ substitute group setting unit 223 is described.

The $(x_1, x_2, x_3)$ substitute group setting unit 223 obtains $P_3$ as the following Equation 8, in the same way as the $(x_1, x_2)$ substitute group setting unit 222.

$$P_3 = I_4 - h_4(h_4^H h_4)^{-1} h_4^H \quad \text{(Equation 8)}$$

The $(x_1, x_2, x_3)$ substitute group setting unit 223 defines $r_{3,k} \equiv y - h_1\hat{x}_1 - h_2\hat{x}_2 - h_3\hat{x}_{3,k}$ (where $(\hat{x}_1,\hat{x}_2) \in B_2$, $\hat{x}_{3,k} \in \Omega$), and selects $\beta$ sets of symbols having less $P_3 r_{3,k}$ for $\beta$ $(\hat{x}_1,\hat{x}_2)$s, i.e., the third substitute group $(B_3 \equiv \{x_1,x_2,x_3)_1,(x_1,x_2,x_3)_2,\ldots,(x_1,x_2,x_3)_\beta\})$, considering all constellation dots for all symbols of $\hat{x}_{3,k}$. Accordingly, $\beta$ substitute groups of $(x_1, x_2, x_3)$ are selected from the total $(\beta \times C)$ numbers of $(x_1, x_2, x_3)$.

Next, the operation of the $(x_1, x_2, x_3, x_4)$ substitute group setting unit 224 is described.

The $(x_1, x_2, x_3, x_4)$ substitute group setting unit 224 finds $x_4$ using the following Equation 9, on the basis of the $\beta$ sets of symbols $\{(\hat{x}_1,\hat{x}_2,\hat{x}_3)\}$ obtained at the previous step.

$$x_{4,\beta} \equiv \text{slicing}\left(\frac{h_4^H}{\|h_4\|^2}(y - h_1\hat{x}_1 - h_2\hat{x}_2 - h_3\hat{x}_3)\right) \quad \text{(Equation 9)}$$

$$(\hat{x}_1,\hat{x}_2,\hat{x}_3) \in B_3$$

Therefore, only one $x_4$ exists for each of the substitute groups of $(x_1, x_2, x_3)$ obtained at the previous step. Accordingly, the $(x_1, x_2, x_3, x_4)$ substitute group setting unit 224 can obtain $\beta$ sets of symbols, i.e., a substitute group $(B_4 \equiv \{(x_1,x_2,x_3,x_4)_1,(x_1,x_2,x_3,x_4)_2,\ldots,(x_1,x_2,x_3,x_4)_\beta\})$, which is a set of substitute vectors that is finally selected.

Subsequently, the substitute group setting unit 220 transmits the substitute group $B_4$ obtained through the above process to the soft value calculator 230.

Meanwhile, in an exemplary embodiment of the present invention, the receiver 200 uses soft values for each bit of transmission signals to obtain a large coding gain in channel decoding. That is, the receiver 200 detects a transmission signal by performing soft decision using a soft value corresponding to each bit of symbols in a plurality of data streams. For this, the soft value calculator 230 calculates and outputs a soft value for each bit of transmission signals. The soft value output from the soft value calculator 230 is a log-likelihood ratio (LLR).

Returning to FIG. 2, the soft value calculator 230 calculates a soft value for each bit of transmission signals, i.e., a log-likelihood ratio, for channel decoding (S104). Further, the multiplexer 240 and the signal processing unit 250 perform channel decoding using the soft values calculated by the soft value calculator 230 and detects the transmission signals (S105).

Figure 4:
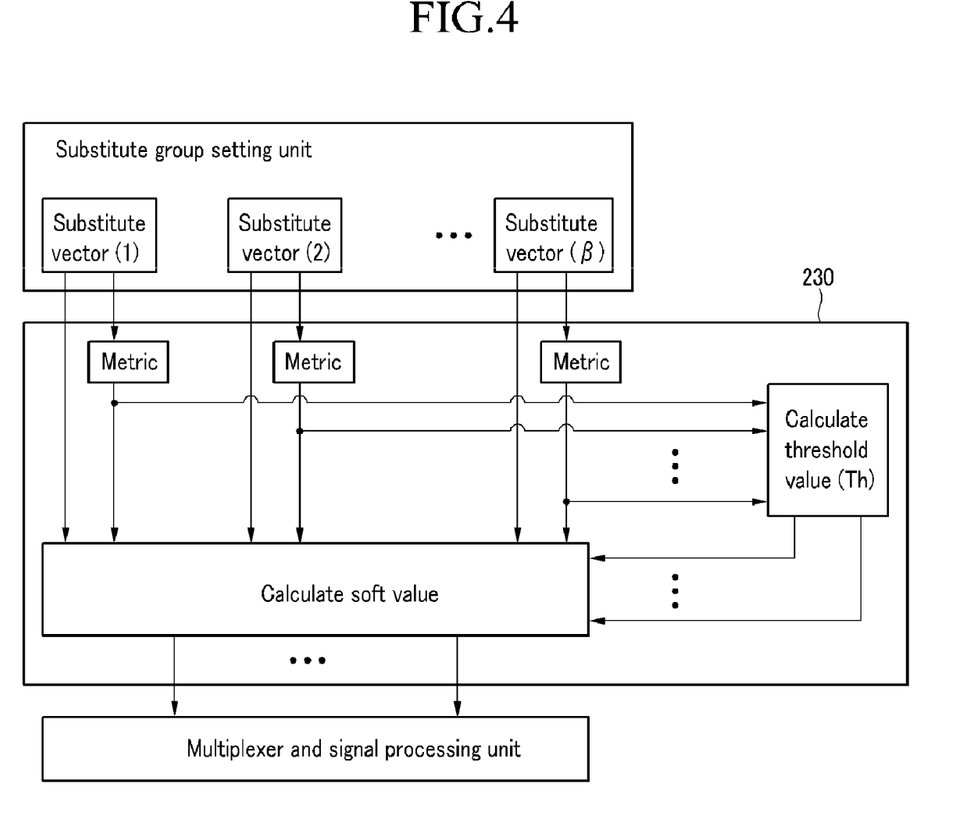
FIG. 4 is a configuration diagram illustrating a soft value calculator according to an exemplary embodiment of the present invention.
Figure 5:
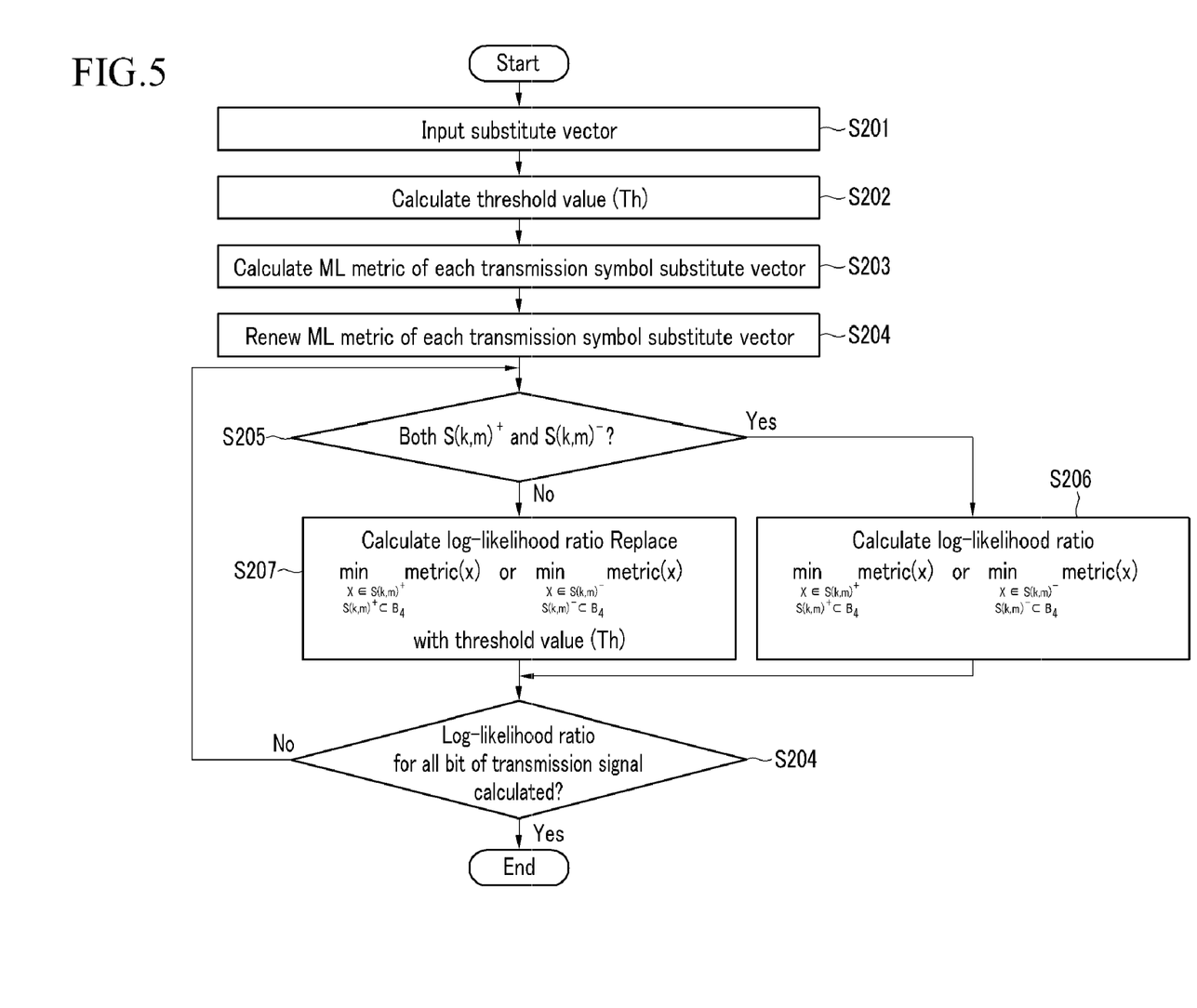
FIG. 5 is a flowchart illustrating a method of calculating a soft value according to an exemplary embodiment of the present invention.

FIG. 4 is a configuration diagram illustrating the soft value calculator 230 according to an exemplary embodiment of the present invention and FIG. 5 is a flowchart illustrating a method of calculating a soft value according to an exemplary embodiment of the present invention, in which each step of the operation of the soft value calculator 230 is sequentially illustrated.

First, the following Equation 10 expresses a common log-likelihood ratio function for calculating a log-likelihood ratio of $b_{k,m}$ that is defined as a k-th bit of the m-th transmission symbol.

$$L(b_{k,m}|y) = \min_{x \in S(k,m)^-} D(x) - \min_{x \in S(k,m)^+} D(x) \quad \text{(Equation 10)}$$

Here, $D(x)$ is a Euclidean distance of a substitute vector of each bit $(b_{k,m})$ of a transmission signal and is defined by $D(x) \equiv \|y - Hx\|$ in an exemplary embodiment of the present invention. Further, $S(k,m)^+$ is a set of substitute vectors corresponding to $+1(b_{k,m}=+1)$ in substitute vectors corresponding to each bit $(b_{k,m})$ of the transmission signal, and $S(k,m)^-$ is a set of substitute vectors corresponding to $-1(b_{k,m}=-1)$ in substitute vectors corresponding to each bit $(b_{k,m})$ of the transmission signal. Meanwhile, the log-likelihood ratio can be obtained for bits of a transmission signal including both $S(k,m)^+$ and $S(k,m)^-$ from Equation 10, but not for bits including only one of them. Therefore, a method of calculating the log-likelihood ratio for bits without $S(k,m)^+$ or $S(k,m)^-$ is needed.

Hereafter, a method of calculating a log-likelihood ratio in the soft value calculator 230 according to an exemplary embodiment of the present invention is described with reference to FIG. 4 and FIG. 5.

$D(x)$ in Equation 10 is defined as a metric corresponding to each substitute vector as in the following Equation 11 in an exemplary embodiment of the present invention.

$$\text{metric}(x_i) \equiv \sqrt{\|y - Hx_i\|} \quad \text{(Equation 11)}$$

Here, $\|y - Hx_i\|$ is a Euclidean distance of a substitute vector of each bit of a transmission signal, and the square root of the Euclidean distance is used as a metric for each substitute vector.

Therefore, Equation 10 can be expressed as the following Equation 12.

$$L(b_{k,m}|y) = \min_{\substack{x \in S(k,m)^- \\ S(k,m)^- \subset B_4}} \text{metric}(x) - \min_{\substack{x \in S(k,m)^+ \\ S(k,m)^+ \subset B_4}} \text{metric}(x) \quad \text{(Equation 12)}$$

When substitute vectors are input (S201), the soft value calculator 230 calculates threshold values (Th) that are needed to calculate log-likelihood ratios of bits without S(k,m)$^+$ or S(k,m)$^-$ from the following Equation 13 or Equation 14 (S202). It can be seen from FIG. 4 that the metric corresponding to each substitute vector is used for calculating a threshold value (Th).

$$Th = \max_{1 \leq i \leq \beta}(\text{metric}(x_i)) \quad \text{(Equation 13)}$$

$$Th = \text{mean}_{1 \leq i \leq \beta}(\text{metric}(x_i)) \quad \text{(Equation 14)}$$

In Equation 13 the maximum value of metrics corresponding to each substitute vector is used as a threshold value (Th), and in Equation 14 the average of metrics corresponding to each substitute vector is used as a threshold value (Th).

On the other hand, the soft value calculator 230 calculates log-likelihood ratios for bits without S(k,m)$^+$ or S(k,m)$^-$ in each bit of a transmission signal using the threshold values (Th) calculated as described above. That is, it is checked whether both S(k,m)$^+$ and S(k,m)$^-$ exist in each bit of a transmission signal (S203), such that when both exist, log-likelihood ratios are calculated from Equation 12 (S204), and when one of them does not exist, log-likelihood ratios are calculated using threshold values (Th) instead of $$\min_{\substack{x \in S(k,m)^+ \\ S(k,m)^+ \subset B_4}} \text{metric}(x) \text{ or } \min_{\substack{x \in S(k,m)^- \\ S(k,m)^- \subset B_4}} \text{metric}(x),$$

as in the following Equation 15 (S205).

$$\min_{\substack{x \in S(k,m)^+ \\ S(k,m)^+ \subset B_4}} \text{metric}(x) = Th \text{ or } \min_{\substack{x \in S(k,m) \\ S(k,m)^- \subset B_4}} \text{metric}(x) = Th \quad \text{(Equation 15)}$$

On the other hand, the soft value calculator 230 repeats the process of calculating a log-likelihood ratio (S203 to S205) until it calculates the log-likelihood ratios of all bits of the transmission signal (S206).

Figure 6:
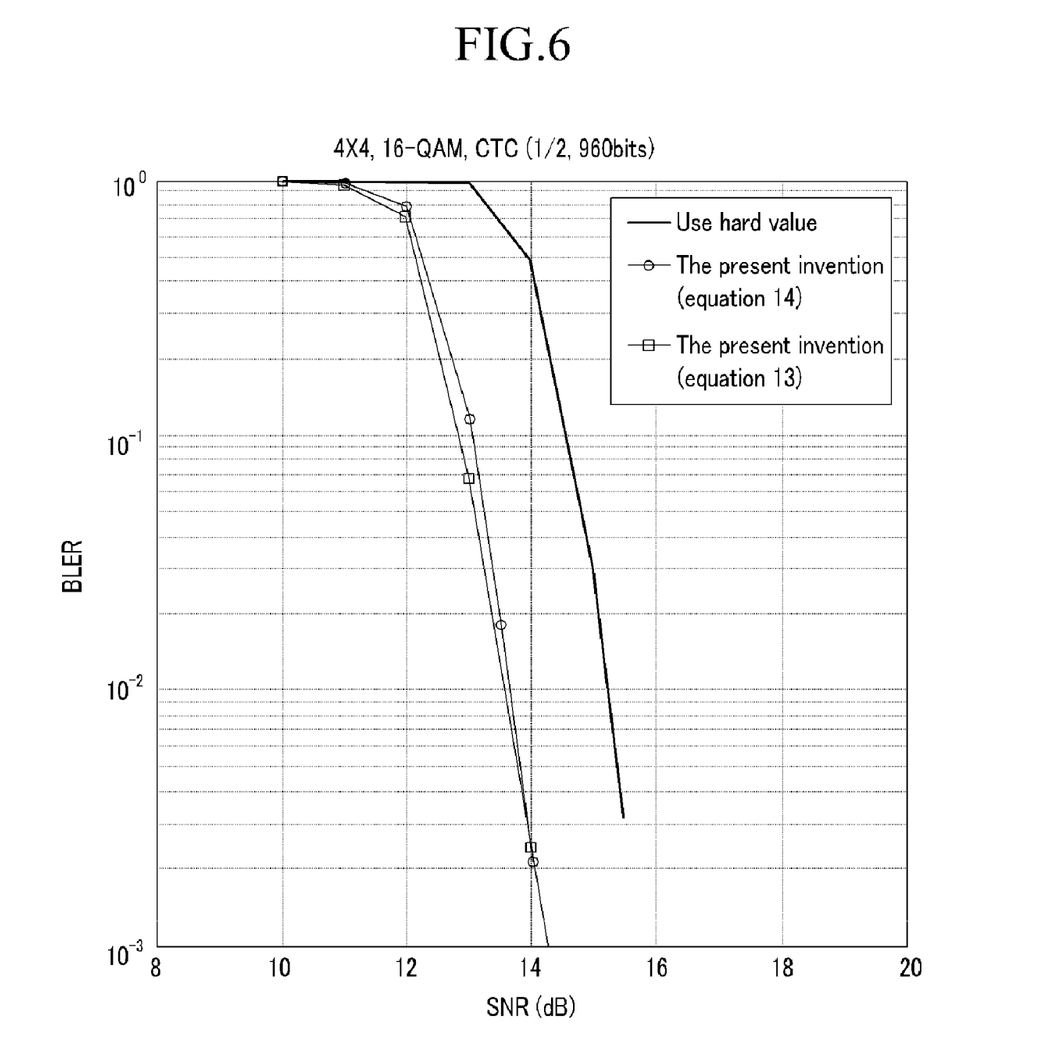
FIG. 6 is a diagram an example of a block error rate when a transmission signal is detected by a receiver according to an exemplary embodiment of the present invention.

FIG. 6 is a diagram illustrating an example of a block error rate when a transmission signal is detected by the receiver 200 according to an exemplary embodiment of the present invention, in which four transmitting/receiving antennas, 16-QAM modulation, and 1/2 code rate CTC (convolutional turbo code) are used.

In this embodiment, the size of an information bit for creating one block, i.e., one code word, is 960 bits, and the number of substitute vectors is 16. It can be seen from FIG. 6 that a gain of about 2 dB can be obtained when a transmission signal is detected by a method of calculating a soft value according to an exemplary embodiment of the present invention, as compared with a method of detecting a transmission signal using a hard value.

That is, the receiver 200 according to an exemplary embodiment of the present invention has improved performance in detecting a transmission signal.

The embodiment of the present invention described above is not only implemented by the method and apparatus, but it may be implemented by a program for executing the functions corresponding to the configuration of the exemplary embodiment of the present invention or a recording medium having the program recorded thereon. These implementations can be realized by the ordinarily skilled person in the art from the description of the above-described exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of calculating a soft value of a receiver, comprising:
    detecting a plurality of substitute vectors using a plurality of data streams;
    calculating a plurality of metrics corresponding to each of the substitute vectors on the basis of square roots of Euclidean distances of the substitute vectors;
    calculating a threshold value using the metrics; and
    calculating a soft value for each bit of a transmission signal using the substitute vectors and the threshold value.

2. The method of claim 1, wherein the calculating of a threshold values is selecting, as a threshold value, the maximum value from the metrics.

3. The method of claim 2, wherein the calculating of a threshold value is selecting, as a threshold value, an average value of the metrics.

4. The method of claim 2, wherein the calculating a soft value comprises:
    detecting a bit having only a first value of the each bit of the transmission signal, as a substitute vector; and
    calculating a soft value of the detected bit using the threshold value and the minimum metric in the metrics of the substitute vector having the first value with respect to the detected bit.

5. The method of claim 3, wherein the calculating of a soft value comprises:
    detecting a bit having only a second value different from the first value of the each bit of the transmission signal, as a substitute vector; and
    calculating a soft value of the detected bit using the threshold value and the minimum metric in the metrics of the substitute vector having the second value with respect to the detected bit.

6. The method of claim 2, wherein the calculating of a soft value comprises:
    detecting a bit including a substitute vector having the first value and the second value in the each bit of the transmission signal; and
    calculating a soft value of the detected bit using the minimum metric in the substitute vectors having the first value and the minimum metric in the substitute vectors having the second value with respect to the detected bit.

7. A method of detecting a transmission signal of a receiver, comprising:
    rearranging a plurality of data streams;
    selecting a plurality of substitute vectors using the rearranged data streams;

calculating a plurality of metrics corresponding to each of the substitute vectors on the basis of square roots of Euclidean distances of the substitute vectors;

calculating a soft value of each bit of a transmission signal using the metrics and threshold values calculated from the metrics; and detecting the transmission signal on the basis of the soft value.

8. The method of claim 7, wherein the rearranging of data streams is sequentially rearranging from a data stream having high signal-to-noise ratio (SNR) in the data streams.

9. The method of claim 8, wherein the calculating a soft value comprises:

calculating the threshold value using the metrics;

calculating a first minimum metric of substitute vectors corresponding to a first value in substitute vectors corresponding to each bit;

calculating a second minimum metric of substitute vectors corresponding to a second value, which is different from the first value, in substitute vectors corresponding to each bit;

calculating a soft value using the first minimum metric and the second minimum metric, for a bit having both a substitute vector of the first value and a substitute vector of the second value in the bits; and calculating a soft value using the threshold value and a corresponding minimum metric in the first minimum metric and the second minimum metric, for a bit having one of the substitute vector of the first value and the substitute vector of the second value in the each bit of the transmission signal.

* * * * *